W. YOUNG.
FENDER FOR MOTOR VEHICLES.
APPLICATION FILED APR. 28, 1911.
1,018,470.
Patented Feb. 27, 1912.
2 SHEETS—SHEET 2.
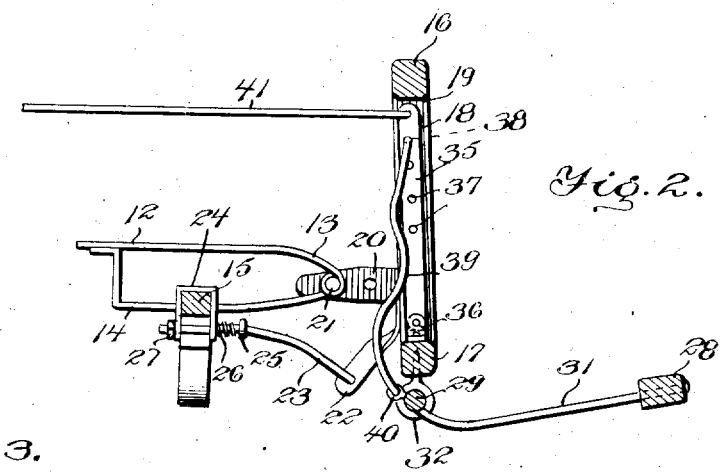
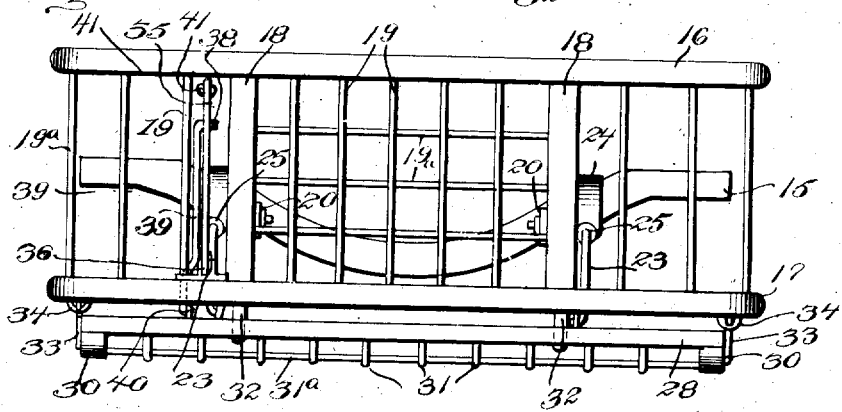
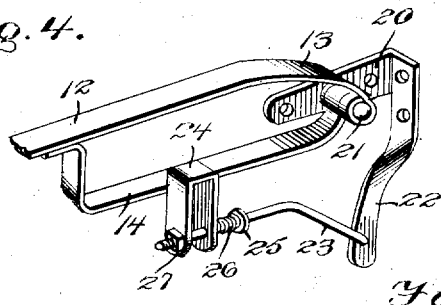
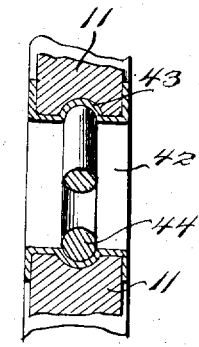
Witnesses
Inventor
W. Young.
By
Attorneys

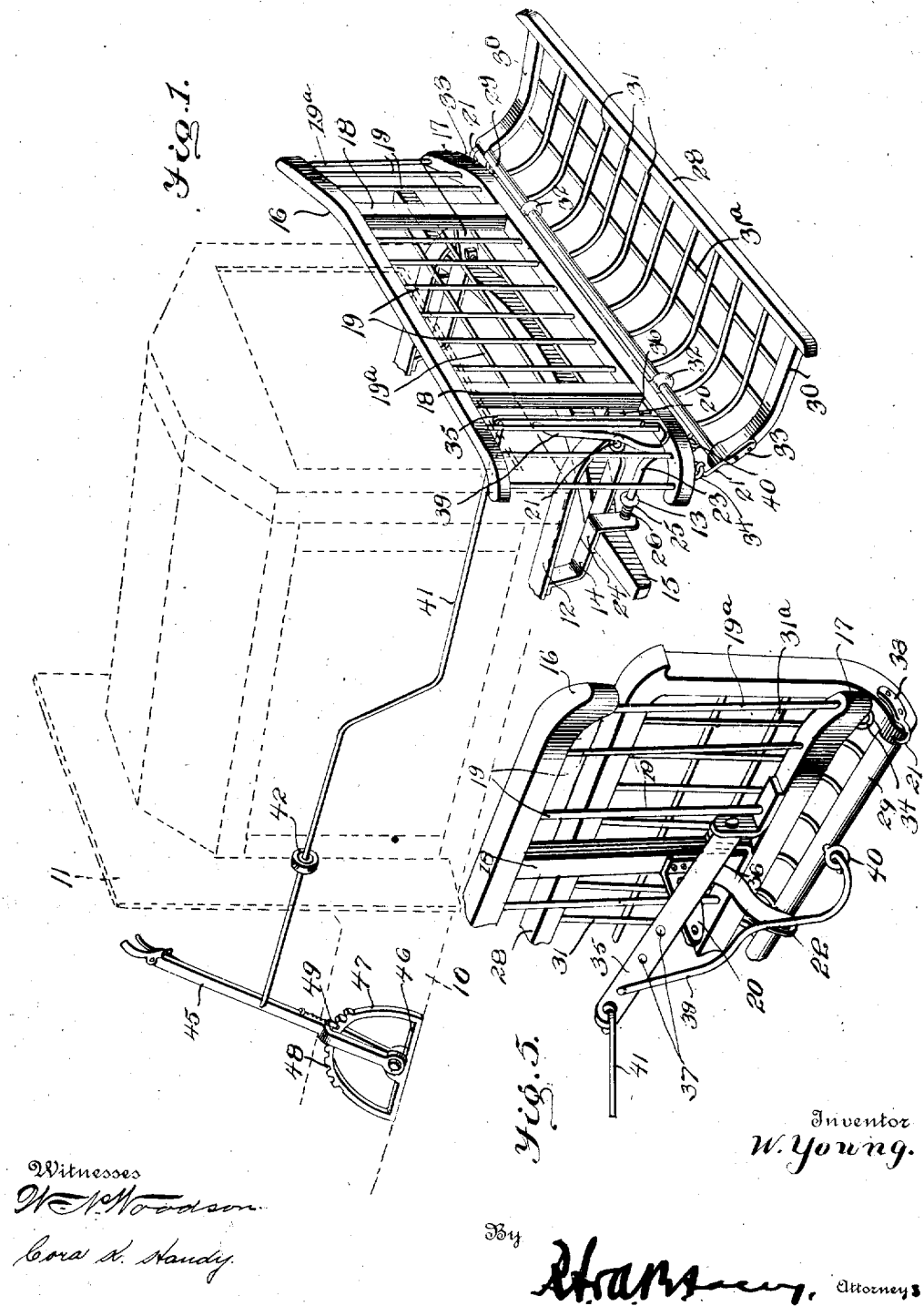

UNITED STATES PATENT OFFICE.

WILLIAM YOUNG, OF SOUTH BELLINGHAM, WASHINGTON.

FENDER FOR MOTOR-VEHICLES.

1,018,470.      Specification of Letters Patent.      Patented Feb. 27, 1912.

Application filed April 28, 1911. Serial No. 623,994.

*To all whom it may concern:*

Be it known that I, WILLIAM YOUNG, citizen of the United States, residing at South Bellingham, in the county of What-com and State of Washington, have invented certain new and useful Improvements in Fenders for Motor-Vehicles, of which the following is a specification.

This invention relates to fenders, and has for an object to provide a fender particularly adaptable to motor vehicles, and one which may be adjusted from the seat of the operator.

Another object of this invention is to provide a fender of this nature with a receiving frame and a mechanism so peculiarly connected to the receiving frame that it requires but a slight movement of a hand lever to fully raise or lower the frame.

The invention further designs a fender provided with attaching means whereby the fender may be secured to the forward leaf springs of the vehicle, and having yielding braces arranged between the fender and the front axle of the vehicle for taking up the vibration of the fender.

The invention generally contemplates a fender of this character which is of comparatively simple construction and easy of operation, is light in weight and may be readily applied, and one which occupies but small space and may be economically manufactured.

For a full understanding of the invention and the merits thereof and also to acquire a knowledge of the details of construction, reference is to be had to the following description and accompanying drawings, in which:

Figure 1 is a perspective view of the improved fender as applied to a motor vehicle; Fig. 2 is a longitudinal section taken centrally through the fender and the forward portion of the vehicle; Fig. 3 is a front elevation of the fender as applied to the vehicle; Fig. 4 is a detail view of one of the connecting devices at the end of the fender; Fig. 5 is a detail perspective view of the operating mechanism for swinging the receiving frame of the fender; and Fig. 6 is a detail sectional view of the bearing ring.

Corresponding and like parts are referred to in the following description and indicated in all the views of the drawings by the same reference characters.

Referring to the drawings, 10 designates the body of a motor vehicle to which the fender is applied.

11 is the usual dashboard, 12 are the side bars of the frame curved down at their forward ends, as at 13, in the usual manner, where they are connected to the forward extremities of springs 14, and 15 designates the front axle of the vehicle of any approved type.

The fender comprises a vertical buffer frame extending across the front of the vehicle and being formed of upper and lower bars 16 and 17 spaced apart by standards 18 positioned therebetween adjacent to their ends. The members 16—17 are further connected by a plurality of spaced vertical rods 19 seated at their ends in the inner opposite sides of the bars 16 and 17, which serve as guards.

The bars 16 and 17 are given a slight backward curve to round off the ends of the buffer frame. Straps 20 are secured across the inner sides of the standards 18 adjacent to their lower ends, and are bent back from the inner edges of the standards and provided with series of openings for the reception of attaching bolts 21 carried through the meeting ends of the bars 13 and the springs 14. The buffer frame is thus permitted to swing out of its vertical position about the bolts 21. Each of the straps is provided with an integral arm 22 and attached to the rear side of each of the standards 18, the same extending down and being curved backwardly to hingedly receive the forward ends of brace rods 23. The brace rods 23 are curved up into a horizontal position and engage beneath the front axle 15, and are slidably held in such position by passing loosely through the lower ends of clips 24 carried over the axle 15. Fixed collars 25 are disposed about the brace rods 23 forwardly of the clips 24, and receive thereagainst the forward ends of coil springs 26 interposed therebetween and the clips 24 to yieldingly hold the rods 23 forward and swing the buffer frame up into vertical position. Tension nuts 27 are disposed in threaded relation upon the rear ends of the rods 23, binding against the clips 24 to regulate the tension of the springs 26 and to limit the forward movement of the rods 23.

The fender is provided with a receiving frame comprising the outer and inner bars 28 and 29 joined at their ends by the side bars 30, and closed in by a plurality of parallel rods 31. The receiving frame is adapted to extend out horizontally from the lower end of the buffer frame, and is given a slight upward curve at its rear edge. The inner bar 29 is rounded and journaled intermediate its ends in a pair of bearings 32 depending from the lower bar 17 of the buffer frame immediately beneath the standards 18. The side bars 30 of the receiving frame carry rearwardly extending and upwardly curved arms 33 engaging in loop-stops 34 depending from the ends of the lower bar 17.

The operating means for raising and lowering the receiving frame comprises an arm 35 hinged at its lower end between a pair of ears 36 carried upon the upper side of the lower bar 17. The arm 35 is adapted to swing up into parallelism with the rods 19 of the buffer frame, and is provided with a plurality of longitudinally spaced openings 37 adjustably receiving the laterally turned upper terminal 38 formed upon the upper end of a push rod or link 39. The push rod or link 39 extends down parallel to the arm 35 and is offset backwardly to pass down below the lower bar 17, where it is hinged upon an eye 40 projecting rearwardly from the rear bar 29 of the receiving frame. A connecting rod 41 is attached to the upper end of the arm 35, and is carried back at one side of the body 10 through the dashboard 11 to a convenient point adjacent to the seat of the operator. A bearing ring 42 engages through the dashboard 11, having its edges overturned against the opposite side of the dashboard 11 to hold the ring 42 in place. An annular pocket or groove 43 is formed in the inner side of the ring 42, receiving a resilient ring 44, preferably of rubber, for loose engagement about the connecting rod 41 to hold the same from vibration.

The connecting rod 41 is hinged at its rear end to a hand lever 45 at a point midway of its ends. The lever 45 is pivoted upon a base plate 46 secured to the bottom of the body 10. A segment 47, having suitably spaced notches 48, is carried upon the base plate 46 and coöperates with a pawl 49 disposed at one edge of the lever 45 to lock the latter in position.

The operation of the improved fender is now apparent, since during the movement of the vehicle the buffer abutting frame is permitted to swing down against the tension of the springs 26 so as to take up the strain upon the bolts 21.

Normally, the fender is in the position disclosed in Fig. 2, wherein the receiving frame is dropped into a horizontal position. The fender is held in this position by the hand lever 45, which is locked to the segment 47 by the pawl 49. When it is desired to raise the receiving frame, to accommodate the motor vehicle in confined places, and to permit of the same passing over the obstructions in the roadway, the operator grasps the hand lever 45 and releases the pawl 49 and draws the lever 45 back and thus pulls the connecting rod 41 through the dashboard 11. The connecting rod 41 swings the arm 35 back to force the push rod 39 down. The push rod 39 turns the inner bar 29 in the bearings 32 swinging the receiving frame up against the buffer frame. As the rear edge of the receiving frame is given a slight upward curve, it is readily seen from Fig. 5 that the receiving frame may be folded flat against the forward side of the buffer frame. The resilient ring 44 carried upon the dashboard loosely engages the connecting rod 41 and holds the same from rattling during the vibration of the vehicle.

Preferably the frames of the fender are reinforced by transverse rods $19^a$ ad $31^a$, closing the frames and preventing the passage of objects therethrough.

It is of course understood that the upper and lower bars 16 and 17 of the buffer frame, and the outer bar 28 of the receiving frame may be made from wood, brass pipe, or any other suitable, light material capable of withstanding the strains to which the fender is subjected. The inner bar 29 of the receiving frame is preferably a solid steel bar, as it supports considerable weight.

The relative size of the fender is preferably such that the usual head lights on the vehicle may throw their rays of light over the upper bar 16, but should the fender be made in such proportions as to extend the buffer frame across the front of the head lights the vertical rods 19 should be curved or broken away, or the fender should be so adjusted as to admit of the uninterrupted passage of the rays of light from the lamps.

Having thus described the invention, what is claimed is:

1. A fender including a buffer frame, straps extending rearwardly from the buffer frame and adapted to be pivoted to the frame of a vehicle, braces connected to the buffer frame and adapted to be slidably connected to the frame of the vehicle, springs operating to maintain said races and the buffer frame connected therewith yieldably in forward position, a receiving frame swingingly connected to the lower edge of the buffer frame, an arm mounted to swing upon said buffer frame, a push rod connected to said arm and to said receiving frame, and means for actuating said arm.

2. A fender comprising a buffer frame, a receiving frame hinged to the lower edge of the buffer frame, an arm pivoted at one end to the buffer frame, a link pivoted at its ends respectively to said arm and to the receiving frame rearwardly of its hinges, and operating means connected to the arm for swinging the same.

3. A fender including a buffer frame, rearwardly extending straps carried by the buffer frame for attachment to the springs of a vehicle, rearwardly extending braces carried at the lower end of said buffer frame for attachment to the axle of the vehicle, an adjustable receiving frame hinged upon the lower end of the buffer frame, and operating means located upon the vehicle, adjacent to the seat of the operator and having connection with the receiving frame for adjusting the same.

4. A fender including a buffer frame, rearwardly extending straps carried by the buffer frame for attachment to the frame of a motor vehicle, depending arms carried by the buffer frame, braces hinged upon the lower ends of the arms and extending back for engagement beneath the frame of the motor vehicle, a receiving frame hinged upon the buffer frame, a connecting rod having connection with the receiving frame and extending back at one side of the motor vehicle to the operator's seat, and manually operated means attached to the connecting rod for moving the same.

In testimony whereof, I affix my signature in presence of two witnesses.

WILLIAM YOUNG. [L. S.]

Witnesses:
JOHN RILEY JARVIS,
WILLIAM CLARK.